(12) United States Patent
Villeminey

(10) Patent No.: US 7,780,238 B2
(45) Date of Patent: Aug. 24, 2010

(54) SELF-RETRACTING HEADREST ASSEMBLY WITH DIVIDED HEADREST

(75) Inventor: Jean-Paul Villeminey, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 30 days.

(21) Appl. No.: 12/274,385

(22) Filed: Nov. 20, 2008

(65) Prior Publication Data

US 2010/0123344 A1    May 20, 2010

(51) Int. Cl.
*A47C 7/36* (2006.01)
(52) U.S. Cl. ........................................ 297/408; 297/404
(58) Field of Classification Search ................ 297/391, 297/403, 406, 407, 408, 61, 216.12, 404
See application file for complete search history.

(56) References Cited

U.S. PATENT DOCUMENTS

| | | | | |
|---|---|---|---|---|
| 4,082,354 A | * | 4/1978 | Renner et al. | 297/410 |
| 4,130,318 A | * | 12/1978 | Hemmen et al. | 297/410 |
| 4,222,608 A | * | 9/1980 | Maeda | 297/410 |
| 4,466,662 A | * | 8/1984 | McDonald et al. | 297/406 |
| 7,367,626 B2 | | 5/2008 | Lawall et al. | |

\* cited by examiner

*Primary Examiner*—Milton Nelson, Jr.
(74) *Attorney, Agent, or Firm*—Quinn Law Group, PLLC

(57) ABSTRACT

A headrest assembly for a seat having a seat back and a seat bottom is provided that includes a headrest having first and second divided headrest portions. First and second articulated arms are pivotably mounted with respect to the seat back in a scissor arrangement and supporting the first and second headrest portions, respectively. Each of the articulated arms has a respective distal portion operatively connected to the seat bottom, preferably with flexible cables and a forked element. The headrest assembly is configured so that the headrest portions pivot to adjacent, use positions when the seat bottom is subjected to at least a predetermined load and to pivot back to separated, non-use positions when the seat bottom is not subject to at least the predetermined load.

14 Claims, 5 Drawing Sheets

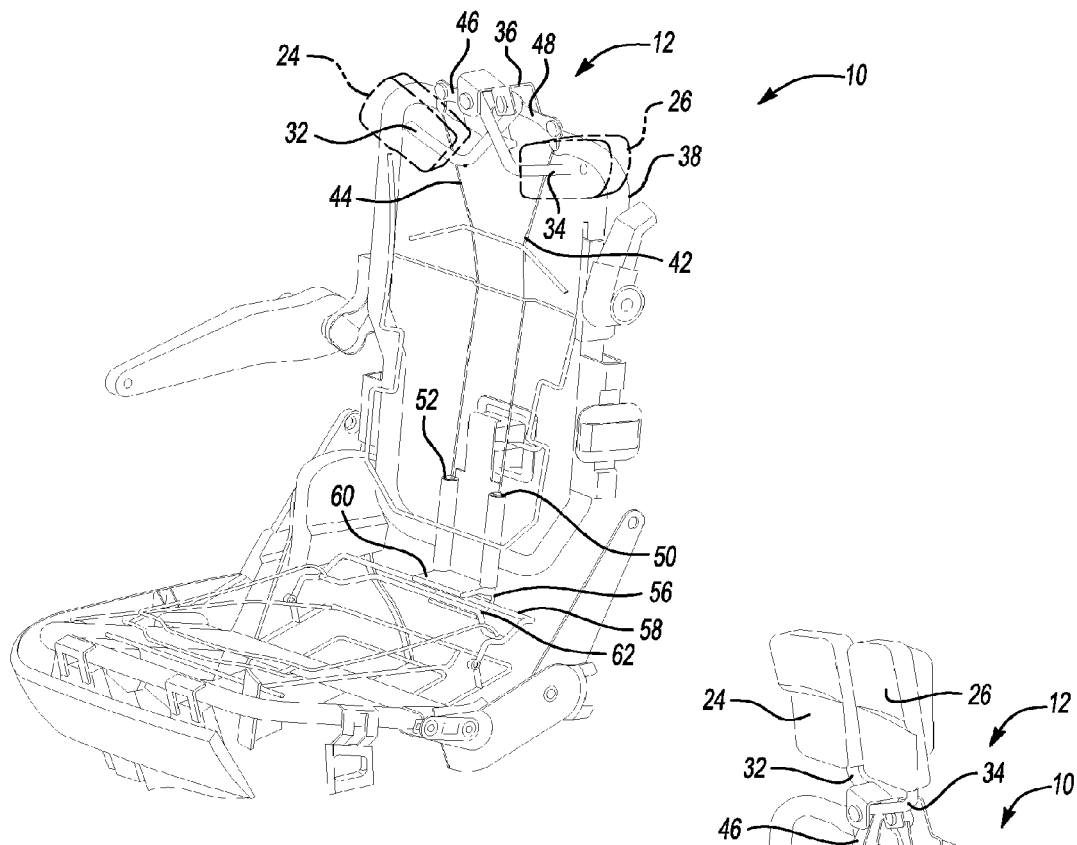
*Fig-3A*
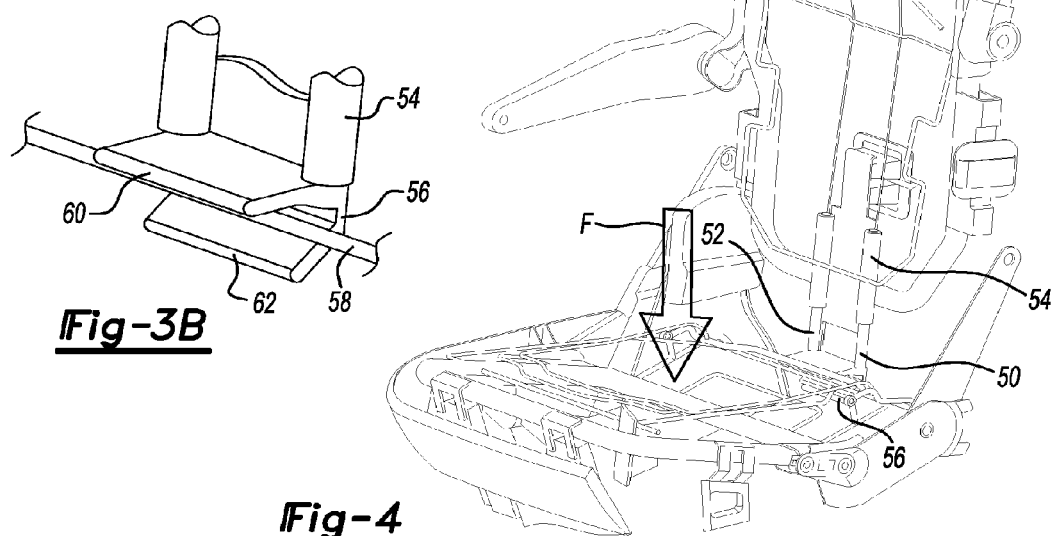
*Fig-3B*
*Fig-4*

US 7,780,238 B2

SELF-RETRACTING HEADREST ASSEMBLY WITH DIVIDED HEADREST

TECHNICAL FIELD

The invention relates to a headrest assembly for a seat, such as a vehicle seat.

BACKGROUND OF THE INVENTION

A seat assembly, such as a vehicle seat assembly, often includes a headrest connected to the seat. It is desirable to be able to move a vehicle headrest between a variety of positions for occupant comfort and for enhanced driver visibility. The art includes a variety of headrest positioning mechanisms. However, the headrest typically remains extended above the seatback even when the seat is unoccupied.

SUMMARY OF THE INVENTION

A headrest assembly is provided that ensures the headrest is automatically retracted to a lowered position when the seat is unoccupied, allowing for an expanded field of vision over the seat. Specifically, a headrest assembly for a seat having a seat back and a seat bottom, is provided that includes a headrest having first and second divided headrest portions. First and second articulated arms are pivotably mounted with respect to the seat back in a scissor arrangement and support the first and second headrest portions, respectively. Each of the articulated arms has a respective distal portion operatively connected to the seat bottom, preferably with flexible cables and a forked element. The headrest assembly is configured so that the headrest portions pivot to adjacent, use positions when the seat bottom is subjected to at least a predetermined load and pivots back to separated, non-use positions when the seat bottom is not subject to at least the predetermined load.

A forked element may be operatively connected to the distal portions of the arms and configured to be engaged with a frame in the seat bottom when the headrest portions are in both the non-use and use positions. The forked element transfers the movement of the seat bottom frame to the cables and, ultimately, to the headrest portions. The forked element is configured to disengage from the seat bottom as the seat back and the seat bottom are pivoted with respect to one another to a stowed position, such as a fold-down or stadium position. Thus, the headrest assembly does not interfere with stowing the seat in these positions when it is unoccupied.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3A is a schematic perspective illustration of the seat and headrest assembly of FIG. 1, with seat cushions removed;

FIG. 3B is a fragmentary schematic illustration of a forked element included in the headrest assembly of FIGS. 1-3A with the forked element engaged with a portion of the seat bottom frame;

FIG. 4 is a schematic perspective illustration of the seat and headrest assembly of FIG. 2, with seat cushions removed;

DESCRIPTION OF THE PREFERRED EMBODIMENTS

Figures 1, 2:
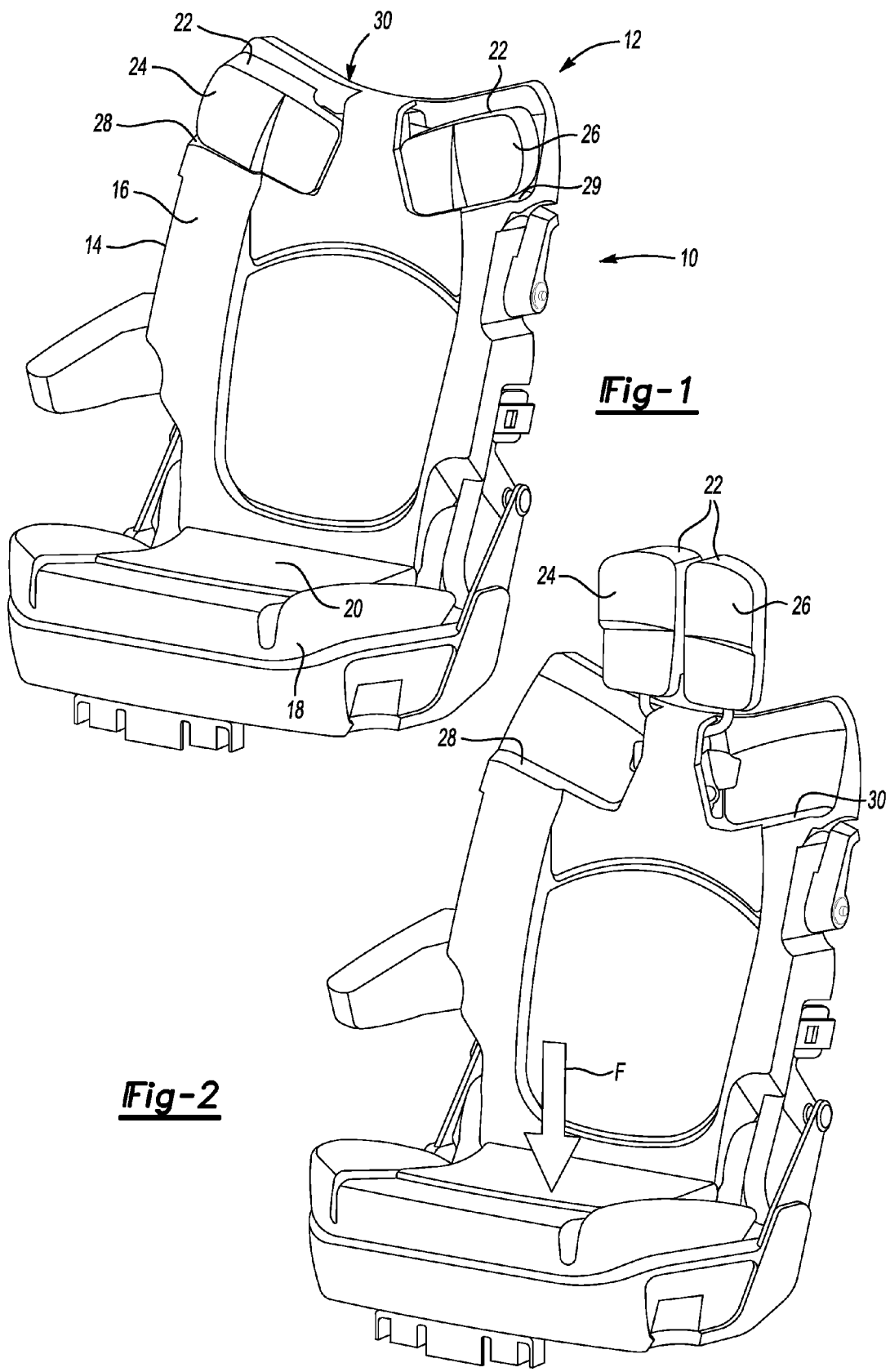
FIG. 1 is a schematic perspective illustration of a first embodiment of a seat with a headrest assembly having headrest portions in stowed positions.
FIG. 2 is a schematic perspective illustration of the seat and headrest assembly of FIG. 1 with the headrest portions in use positions.

Referring to the drawings, wherein like reference numbers refer to like components throughout the several views, FIG. 1 shows a vehicle seat 10 with a headrest assembly 12. The seat 10 has a seat back 14, including a seat back cushion 16, and a seat bottom 18 with a seat bottom cushion 20. The headrest assembly 12 includes a divided headrest 22, with a first headrest portion 24, and a separate second headrest portion 26, shown separated from one another in the non-use positions of FIG. 1, and pivotable with respect to the seat back 14 to be adjacent one another in the use positions of FIG. 2. As shown in FIG. 1, in the non-use positions, the headrest portions 24, 26 are nested in cavities 28, 29 in the cushion 16 so that the headrest portions 24, 26 do not extend beyond an upper surface 30 of the seat back cushion 16. This allows an unobstructed view over the seat back 14 for the driver of a vehicle having the seat 10 installed therein, assuming that the seat 10 is not the driver's seat. If the seat is the driver's seat, the headrest portions 24, 26 will remain in the use positions until the driver exits the seat 10. As explained below, the headrest assembly 12 is configured so that the headrest portions 24, 26 are self-retracted into the non-use positions in the absence of a predetermined load on the seat 10, and pivot to the use positions when a predetermined load (represented by downward force F) is placed on the seat 10. The predetermined load F may be based on a minimum weight of an expected seat occupant.

Figure 5:
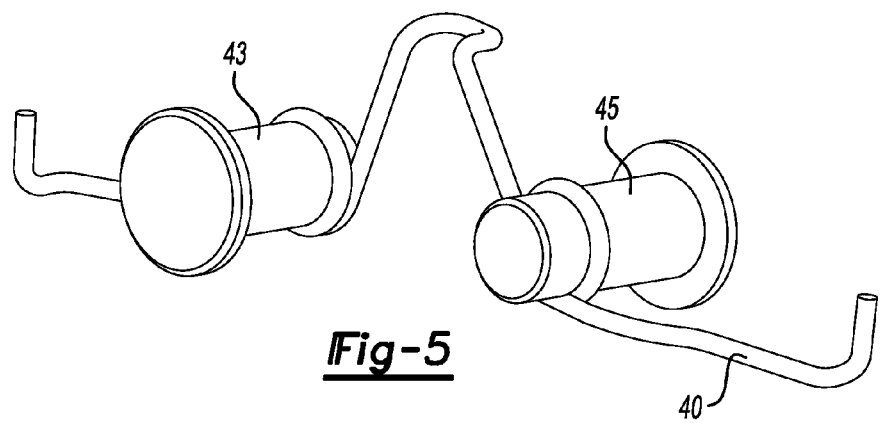
FIG. 5 is a schematic perspective illustration of a double torsion spring used to bias the head rest portions of FIGS. 1-4 to the stowed positions.

Referring to FIG. 3A, the seat 10 is shown with the cushions 16, 20 removed to afford a view of the internal components of the headrest assembly 12. Specifically, the headrest assembly 12 includes first and second articulated arms 32, 34 that support the first and second headrest portions 24, 26, respectively (shown in phantom to reveal the arms 32, 34). The articulated arms 32, 34 are mounted to a bracket 36 secured a seatback frame 38. The articulated arms 32, 34 are mounted so that they may pivot with respect to the seatback frame 38 to move the headrest positions 24, 26 between the use and non-use positions. The arms 32, 34 move in a scissor motion between the use and non-use positions, about respective pivot points. A dual torsional spring 40, shown best in FIG. 5 is supported on pins 43, 45 that secure the bracket 36 to the frame 38. The spring 40 exerts force on the arms 32, 34 to bias the arms 32, 34, and thus the headrest portions 24, 26, to the non-use positions of FIG. 1.

First and second flexible cables 42, 44 are secured to distal portions 46, 48 of the respective first and second arms 32, 34.

Opposing ends of the cables 42, 44 are secured to first and second pistons 50, 52, which are supported for guided motion through piston cavities formed in a guide sleeve 54. The pistons 50, 52 are rigidly secured to, or formed unitarily with, a forked element 56. The forked element 56 is configured to be engaged with a seat bottom frame 58 in both the use and non-use positions. Upper and lower fork element portions 60, 62 surround the seat bottom frame 58. Specifically, when a load at least as great as the predetermined load, such as a preselected weight representative of a seat occupant is placed on the seat 10, the seat bottom frame 58 will be moved under the load from the non-use position of FIG. 1 to the use position of FIG. 2, with the forked element 56 engaged to the seat bottom frame 58 throughout the motion. Due to the motion of the forked element 56, the pistons 50, 52 and cables 42, 44 are pulled downward, causing the arms 32, 34 to pivot upward, with the headrest portions 24, 26 moving toward one another to the use positions, as shown in FIG. 4.

Figures 6, 7:
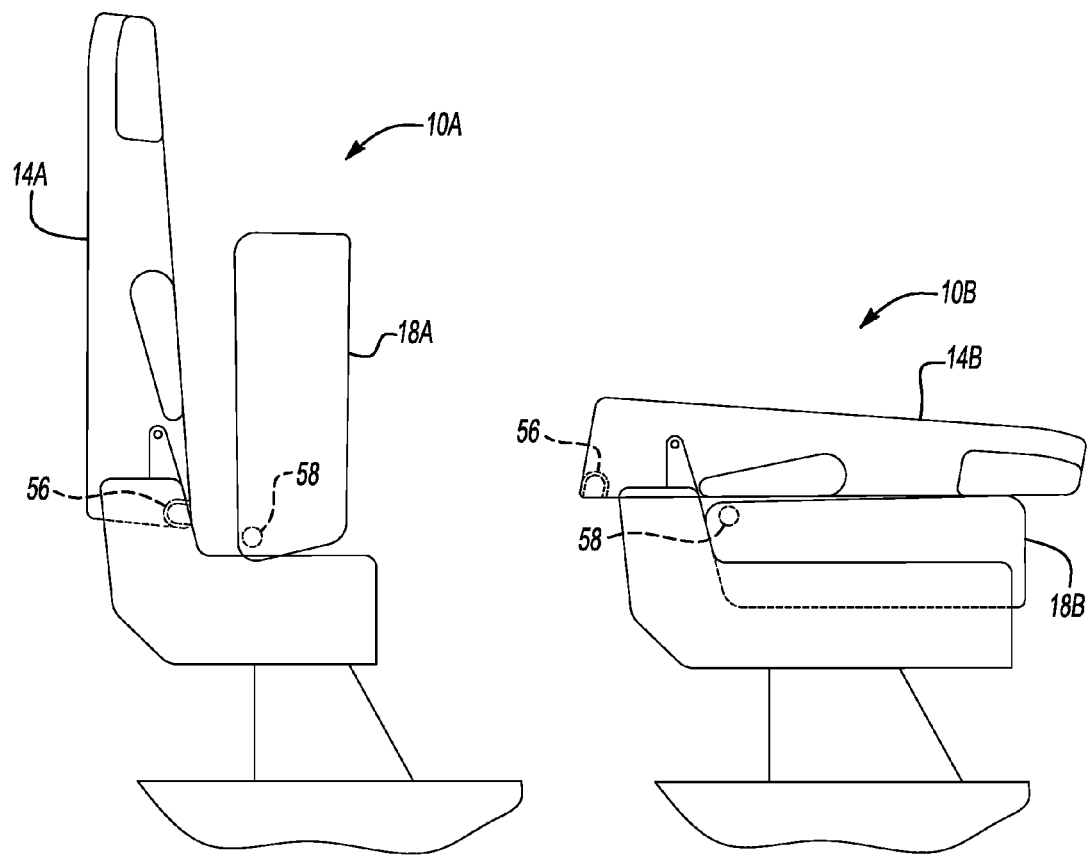
FIG. 6 is a schematic side view illustration of an alternative embodiment of a seat with the headrest assembly of FIGS. 1-4 in a stadium stowed position.
FIG. 7 is a schematic side view illustration of another alternative embodiment of a seat with the headrest assembly of FIGS. 1-4 in a seat back down position.

The forked element 56 is configured to disengage from the seat bottom frame 58 when the seat 10 is moved to a folded, collapsed or stowed position. Because the forked element 56 is open in the direction of the seat bottom frame 58, movement of the forked element 56 backward away from the seat bottom frame 58, or movement of the seat bottom frame 58 forward away from the forked element 56 is possible without interference or contact between the forked element 56 and the seat bottom frame 58. Thus, the headrest assembly 12 may be used in a seat 10A that may be moved to a stadium position, as shown in FIG. 6, by pivoting the seat bottom 18A forward and away from the seat back 14A, as shown in FIG. 6. Alternatively, the headrest assembly 12 may be used in a seat 10B that may be moved to a fold-down position, as shown in FIG. 7, with the seat back 14B (and the forked element 56 that moves therewith) moving up and away from the seat bottom 18B and the seat bottom frame 58.

Figure 8:
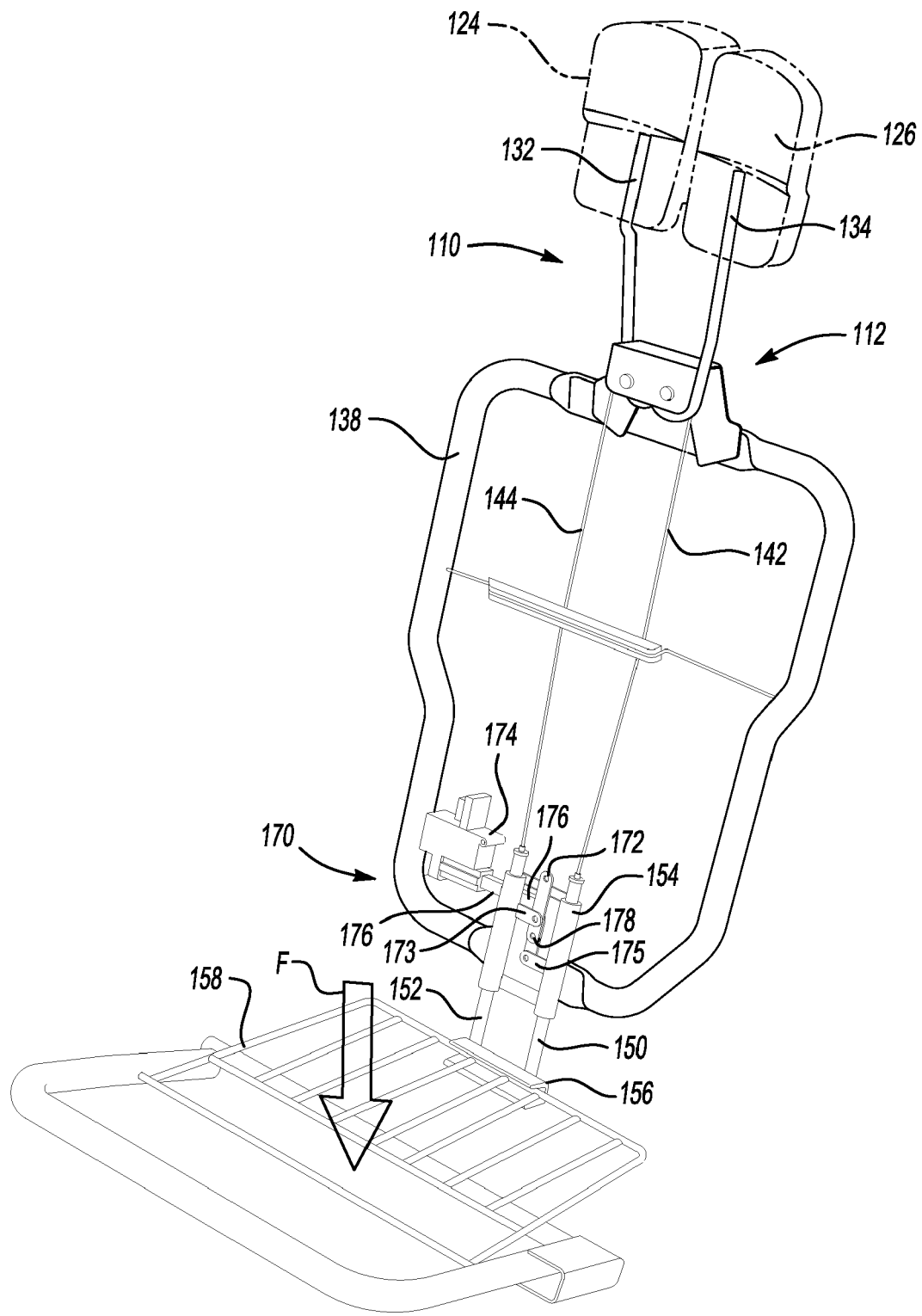
FIG. 8 is a schematic perspective illustration of yet another alternative embodiment of a seat and headrest assembly with headrest portions in use positions.
Figure 9:
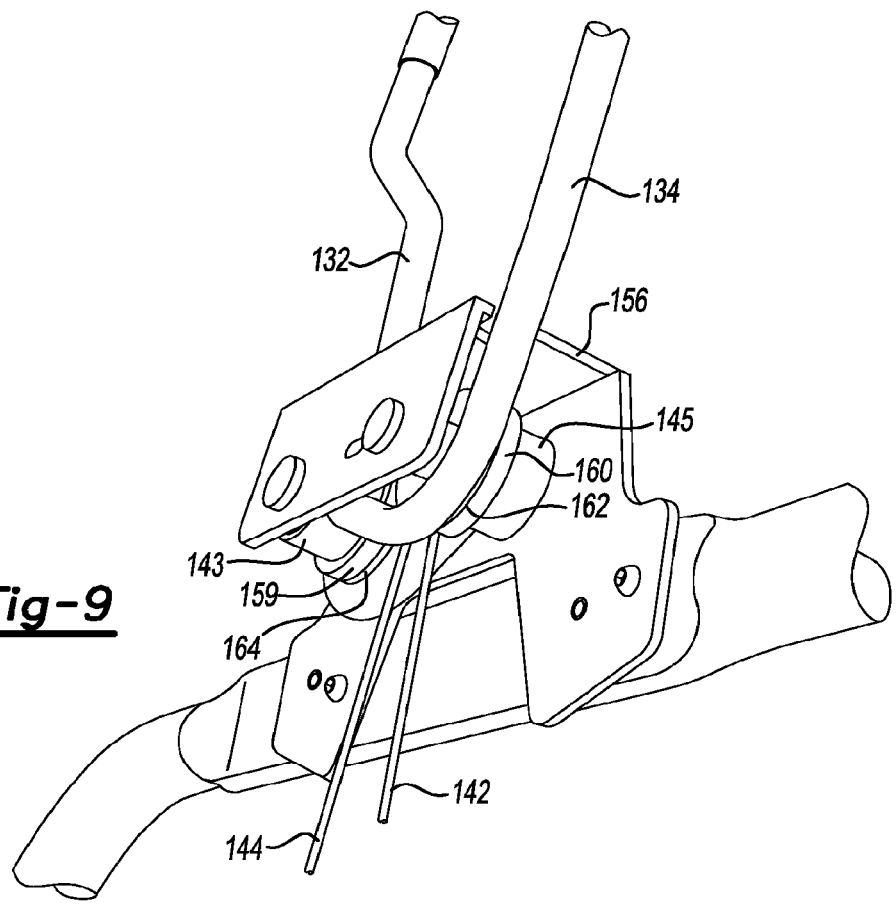
FIG. 9 is a schematic illustration in fragmentary perspective view of the headrest assembly of FIG. 8.
Figure 10:
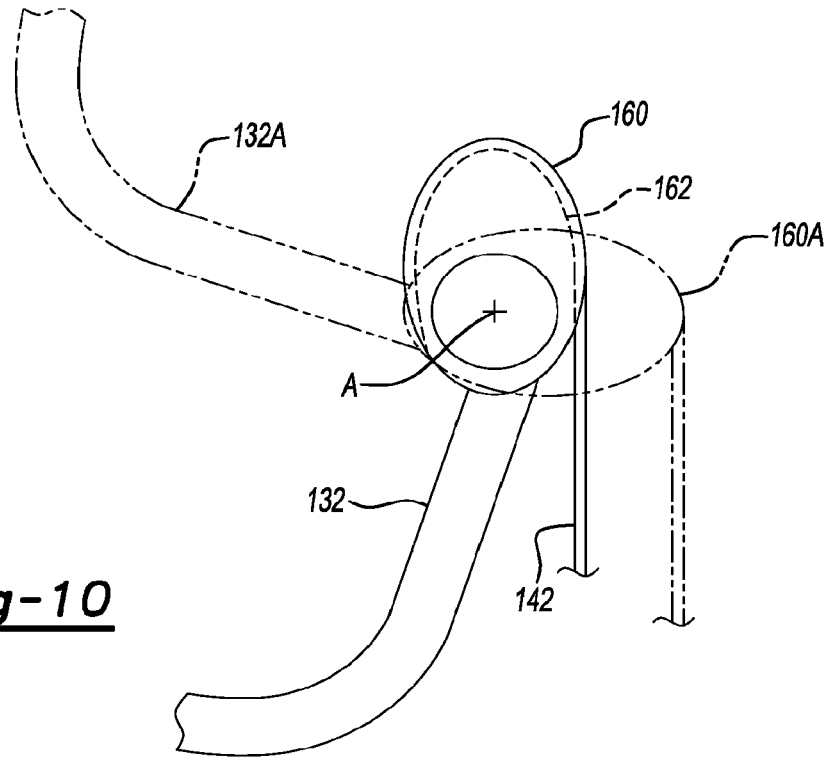
FIG. 10 is a schematic illustration in fragmentary front view of the headrest assembly of FIGS. 8 and 9.

FIGS. 8-10 show a seat 110 with the seat cushions removed to show an alternative headrest assembly 112, a seat back frame 138 and a seat bottom frame 158. The seat 110 is shown as though occupied, so that a forked element 156 engaged with seat bottom frame 158 is moved downward with seat bottom frame 158 under an occupant's weight (represented by downward force F), to tighten cables 142, 144 and move the arms 132, 134 of the headrest portions 124, 126 attached thereto (shown in phantom only) to the use position via a scissor motion.

As best shown in FIG. 9, the pins 143, 145 that attach the arms 132, 134 to the bracket 156 have cam lobes 159, 160 with a respective groove 164, 162 formed in each cam lobe. Ends of the cables 142, 144 are secured to the cam lobes 159, 160 in the grooves 162, 164. When the cables 142, 144 are pulled taut, the cam lobes 159, 160 rotate to move the arms 132, 134 to the upright (use) position. Referring to FIG. 10, the arm 132 is shown in the non-use position. When the cable 142 is pulled tight by a load acting on the seat bottom operatively connected thereto, the cam lobe 160 rotates about pivot point A to the position shown in phantom in which the cam lobe is referred to as 160A, causing the arm 132 to move to the use position shown in phantom in which the arm is referred to as 132A. The cam lobe 159, arm 134 and cable 144 are arranged similarly.

Referring again to FIG. 8, a latching mechanism 170 is used to automatically secure the headrest portions 124, 126 in the use positions once they have been moved thereto under the weight of a seated occupant, eliminating any vibrations or slight separating movements of the headrest portions that may otherwise occur due to shifting of weight in the seat 110. The latching mechanism 170 includes a vertical arm 172 pivotably mounted to the sleeve 154 that forms the cavities that pistons 150, 152 ride in. Latching arms 173, 175 are mounted to the vertical arm 172 and pass through the adjacent cylinder cavities in the sleeve 154 to press against the respective cables 142, 144 therein, latching them into the use positions shown.

An electronic actuator 174 mounted to the seat back frame 138 selectively pulls an actuator arm 176 to the left as shown in FIG. 8, moving the vertical arm 172 about pivot point 178 to the actuated position shown. A sensor (not shown) placed at the inner surface of the forked element 156 may be used to signal the actuator 174 to deploy when the sensor senses a change in position of the lower seat frame 158 with respect to the sensor to the use position. When the predetermined load F is removed from the lower seat frame 158, such as when the seat 110 becomes unoccupied, the sensor sends another signal to the actuator 174, causing the actuator 174 to release the arm 176, moving arm 176 to the right in FIG. 8, causing vertical element 172 to pivot slightly clockwise about pivot point 178 so that the latching arms 173, 175 move out of the cylinder cavities, releasing the cables 142, 144. The actuator 176 may be controlled to operate with a delay, so that the actuator is not released until a predetermined time after load removal, and there being no additional signals consistent with occupancy of the seat are received. This will prevent release of the latching mechanism 170 when an occupant merely shifts in the seat.

While the best modes for carrying out the invention have been described in detail, those familiar with the art to which this invention relates will recognize various alternative designs and embodiments for practicing the invention within the scope of the appended claims.

The invention claimed is:

1. A headrest assembly in combination with a seat having a seat back and a seat bottom, comprising:
    a headrest having first and second divided headrest portions;
    first and second articulated arms pivotably mounted with respect to the seat back in a scissor arrangement and supporting the first and second headrest portions, respectively; wherein each of the articulated arms has a respective distal portion operatively connected to the seat bottom; and
    wherein the headrest assembly is configured so that the headrest portions pivot to adjacent, use positions when the seat bottom is subjected to at least a predetermined load and pivot back to separated, non-use positions when the predetermined load is removed from the seat bottom.

2. The headrest assembly in combination with the seat of claim 1, further comprising:
    a bracket mounted to the seat back; wherein the first and second arms are pivotably mounted to the bracket.

3. The headrest assembly in combination with the seat of claim 2, further comprising:
    at least one spring operatively connected to the bracket and biasing the headrest portions to the non-use positions.

4. The headrest assembly in combination with the seat of claim 1, wherein the seat back and the seat bottom are selectively pivotable with respect to one another to a stowed position, and further comprising:
    a forked element operatively connected to the distal portions of the arms and configured to be engaged with the seat bottom when the headrest portions are in both the non-use and use positions; and configured to disengage from the seat bottom as the seat back and the seat bottom are pivoted with respect to one another to the stowed position.

5. The headrest assembly in combination with the seat of claim 1, further comprising:
a first and a second flexible cable operatively connected to the first and the second arm, respectively, and to the seat bottom when the headrest portions are in both the use and the non-use positions.

6. The headrest assembly in combination with the seat of claim 5, further comprising:
a first and a second cam lobe at the first and the second distal portions of the first and second arms, respectively, and pivotable with the arms; wherein the first and the second flexible cables wrap at least partially around the respective cam lobes.

7. The headrest assembly in combination with the seat of claim 5, further comprising:
a guide sleeve connected to the seat back between the seat bottom and the arms;
a first and a second piston connected to the first and the second flexible cable, respectively, and supported for movement through the guide sleeve when the seat bottom is subjected to at least the predetermined load.

8. The headrest assembly in combination with the seat of claim 7, wherein the pistons are selectively lockable to retain the headrest portions in the use positions.

9. The headrest assembly in combination with the seat of claim 1, wherein the seat back includes a seat back cushion covering a seat back frame; and wherein the headrest portions do not extend beyond an upper surface of the seat back cushion when in the non-use positions.

10. A headrest assembly in combination with a seat having a seat back with a seat back frame and a seat bottom with a seat bottom frame, comprising:
a divided headrest having a first headrest portion and a second headrest portion;
first and second articulated arms pivotably mounted with respect to the seat back frame and supporting the first and second headrest portions, respectively; wherein each of the articulated arm has a respective distal portion operatively connected to the seat bottom frame; and
wherein the headrest assembly is configured so that the headrest portions retract to separated, non-use positions when the seat is not subject to a predetermined load and pivot to lockable use positions when the seat is subjected to at least the predetermined load.

11. The headrest assembly in combination with the seat of claim 10, wherein the seat back and the seat bottom are selectively pivotable with respect to one another to a stowed position, and further comprising:
a forked element operatively connected to the distal portions of the arms and engaged with the seat bottom frame when the headrest portions are in both the non-use and the use positions; and configured to disengage from the seat bottom frame as the seat back and the seat bottom are pivoted with respect to one another to the stowed position.

12. The headrest assembly in combination with the seat of claim 11, further comprising:
a guide sleeve connected to the seat back frame between the seat bottom frame and the arms;
a first and a second flexible cable operatively connected to the respective distal portions of the first and the second articulated arms;
a first and a second piston connected to the first and the second flexible cable, respectively, and to the forked element, and supported for movement through the guide sleeve to an in-use position when the seat is subjected to the predetermined load.

13. The headrest assembly in combination with the seat of claim 10, wherein the articulated arms are mounted to the seat back frame with the respective distal portions pivoting downward and the headrest portions pivoting upward in scissor motion when the headrest portions move from the non-use positions to the use positions.

14. A headrest assembly in combination with a seat having a seat back and a seat bottom, comprising:
a headrest having first and second divided headrest portions;
first and second articulated arms pivotably mounted with respect to the seat back in a scissor arrangement and supporting the first and second headrest portions, respectively; wherein each of the articulated arms has a respective distal portion operatively connected to the seat bottom;
wherein the headrest assembly is configured so that the headrest portions pivot to adjacent, use positions when the seat bottom is subjected to at least a predetermined load and pivot back to separated, non-use positions when the predetermined load is removed from the seat bottom;
wherein the seat back and the seat bottom are selectively pivotable with respect to one another to a stowed position;
a first and a second flexible cable operatively connected to the first and the second arm, respectively;
a forked element operatively connected to the flexible cables and configured to be engaged with the seat bottom to move the headrest portions to the use positions when the seat bottom is subject to at least the predetermined load;
wherein the forked element is configured to disengage from the seat bottom as the seat back and the seat bottom are pivoted with respect to one another to the stowed position;
a guide sleeve connected to the seat back between the seat bottom and the arms; and
a first and a second piston connected to the first and the second flexible cable, respectively, and supported for movement through the guide sleeve when the seat bottom is subjected to at least the predetermined load.

\* \* \* \* \*